Jan. 22, 1935.  A. V. SANTARSIERO  1,988,919
AEROPLANE AND HELICOPTER
Filed Oct. 21, 1932  4 Sheets-Sheet 1

Inventor

A. SANTARSIERO

By Mason Fenwick Lawrence
Attorney

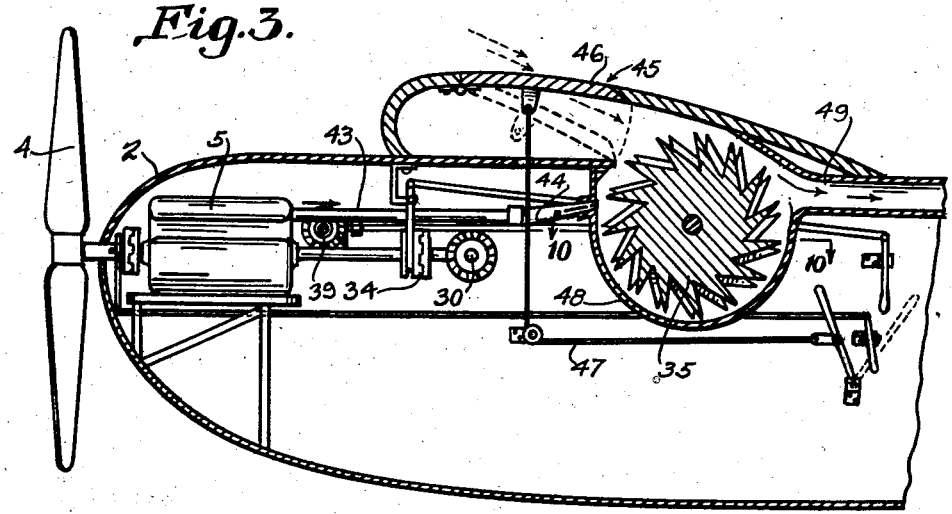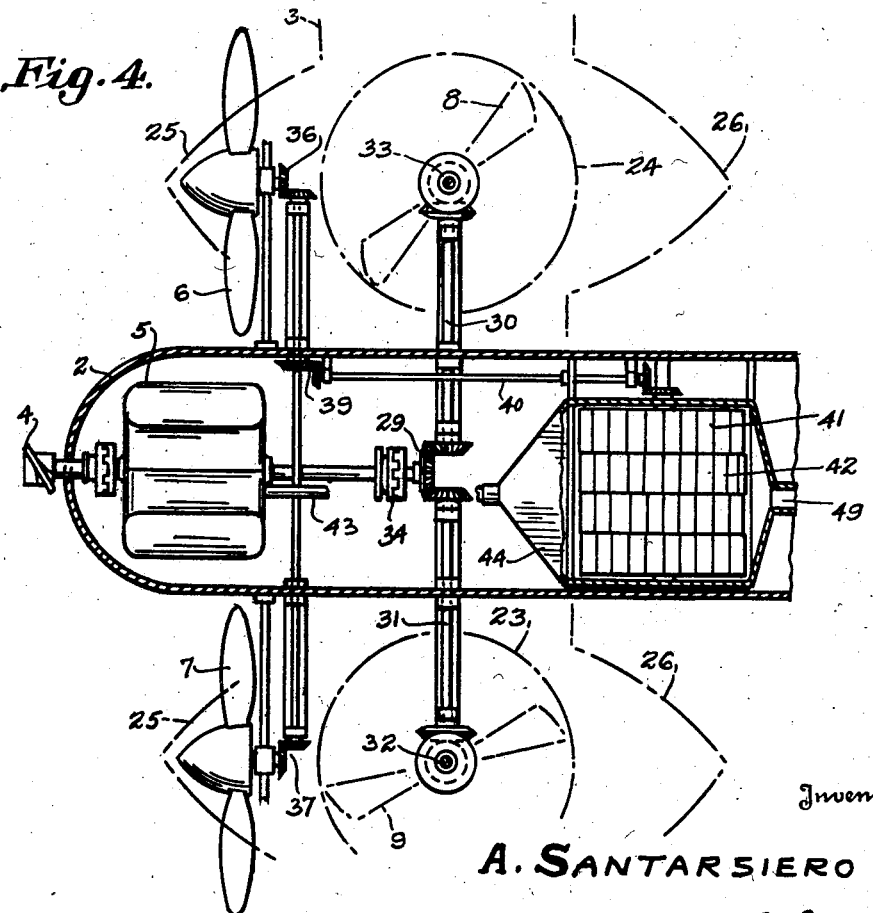

A. SANTARSIERO

Jan. 22, 1935.  A. V. SANTARSIERO  1,988,919
AEROPLANE AND HELICOPTER
Filed Oct. 21, 1932  4 Sheets-Sheet 4
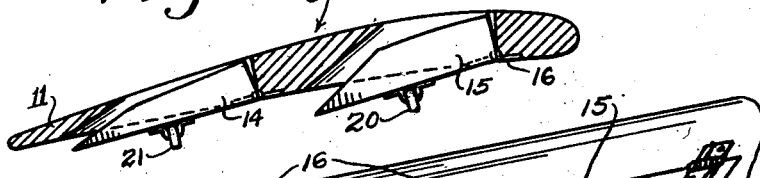
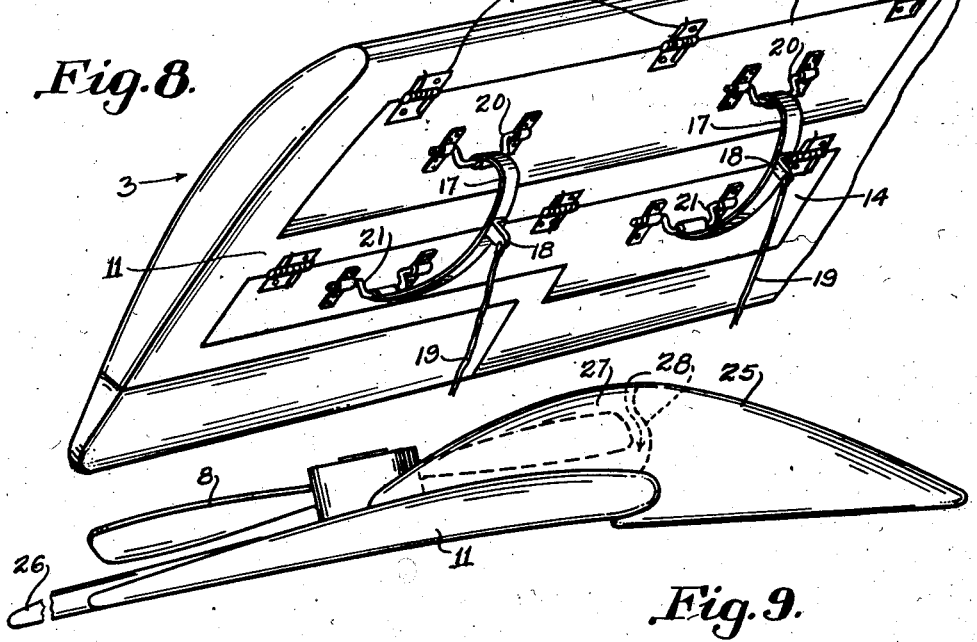
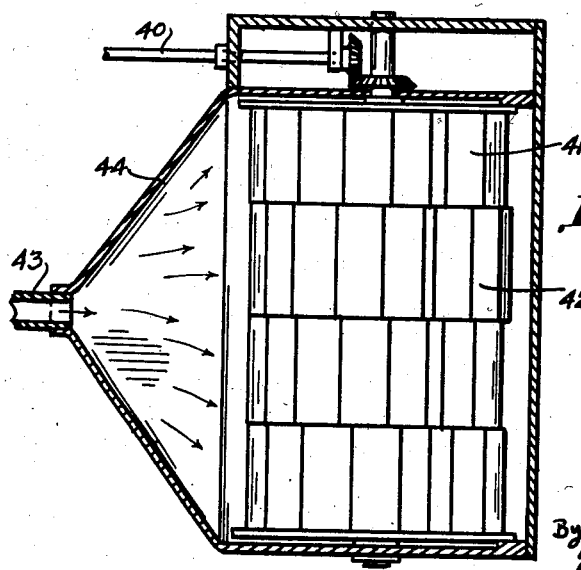
Inventor
A. SANTARSIERO Patented Jan. 22, 1935

1,988,919

UNITED STATES PATENT OFFICE 1,988,919

AEROPLANE AND HELICOPTER

Antonio V. Santarsiero, New York, N. Y.

Application October 21, 1932, Serial No. 638,959

3 Claims. (Cl. 244—15)

This invention relates to aircraft and has for its object the provision of means for enabling the craft to rise and descend vertically, and for improving the efficiency and enhancing the safety of flight. More specifically stated, the invention has for one of its objects the provision of an air foil or wing having wells for receiving the slip stream of helicopter propellers located adjacent said wing with extensions fore and aft of said wells compensating in sustaining area for the openings in the wing constituted by said wells.

Another object of the invention is the provision of louvres in the wing or air foil and hinged panels normally closing said louvres for horizontal flight, but being arranged to be positively opened, reducing the wing or air foil to a mere framework for minimizing the resistance to vertical flight.

A further object of the invention is a control system so arranged that the hinged panels have freedom of movement during normal flight whereby they may respond to differential pressures above and below the wing on either side thereof, yielding to superior pressures on either wing from above, and maintaining the lateral stability of the aircraft.

Another object of the invention is the provision of a main propeller, normally directly power driven, for normal horizontal flight and auxiliary lateral propellers operating in planes parallel to the main propeller and selectively driven through the exhaust of the main power plant or, when said power plant is not in operation and the aircraft is in steep descent, operating through the created draft of travel acting upon a turbine suitably located operatively connected to said lateral propellers.

Still another object of the invention is the provision of a turbine of the velocity impact type located within the fuselage so as to minimize head wind resistance, and operatively positioned to be acted upon alternatively or simultaneously by the exhaust of the main power plant and by a travel created draft admitted to said turbine through a louvre in the central portion of said wing normally closed by a panel which when open, acts as a deflector.

Other objects of the invention will appear as the following description of a preferred and practical embodiment thereof proceeds.

In the drawings which accompany and form a part of the following specification and throughout the several figures of which, the same characters of reference have been designated to identify identical parts:

Figures 1 and 2 are perspective views of an aircraft equipped with the novel features of my invention, Figure 1 showing the wing louvres open in the position for vertical ascent, while Figure 2 shows the wing louvres on one side closed in the position assumed when a differential air pressure exists on the top sides of the wing;

Figure 3 is a vertical section through the forward part of the fuselage;

Figure 4 is a horizontal section through the forward part of the fuselage;

Figure 7 is a cross section through one wing showing the louvres partly open;

Figure 8 is a perspective view of the underside of a portion of the wing;

Figure 9 is an end elevation of the wing, showing the extensions fore and aft of the propeller well, the rearward extension being shown broken; and Figure 10 is a section taken along the line 10—10 of Figure 3.

Figure 1:
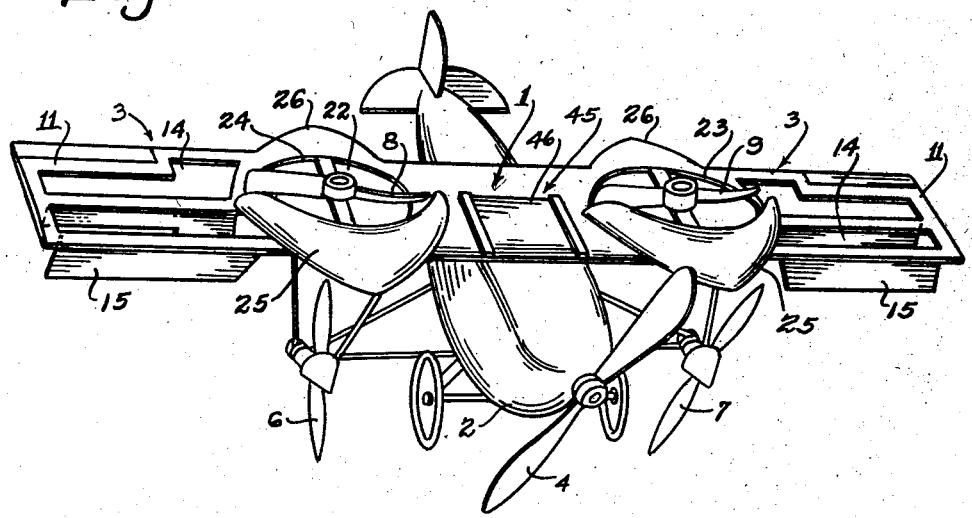
Figure 2:
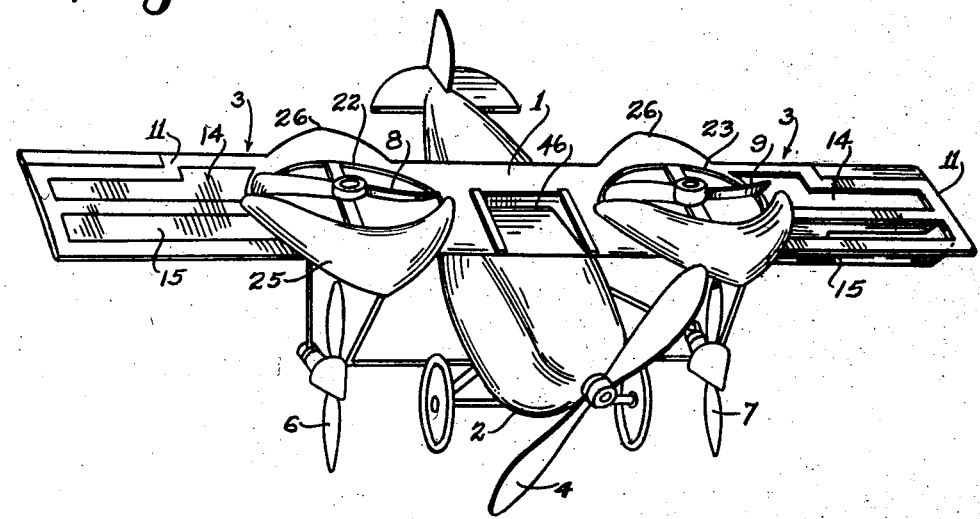
Figure 5:
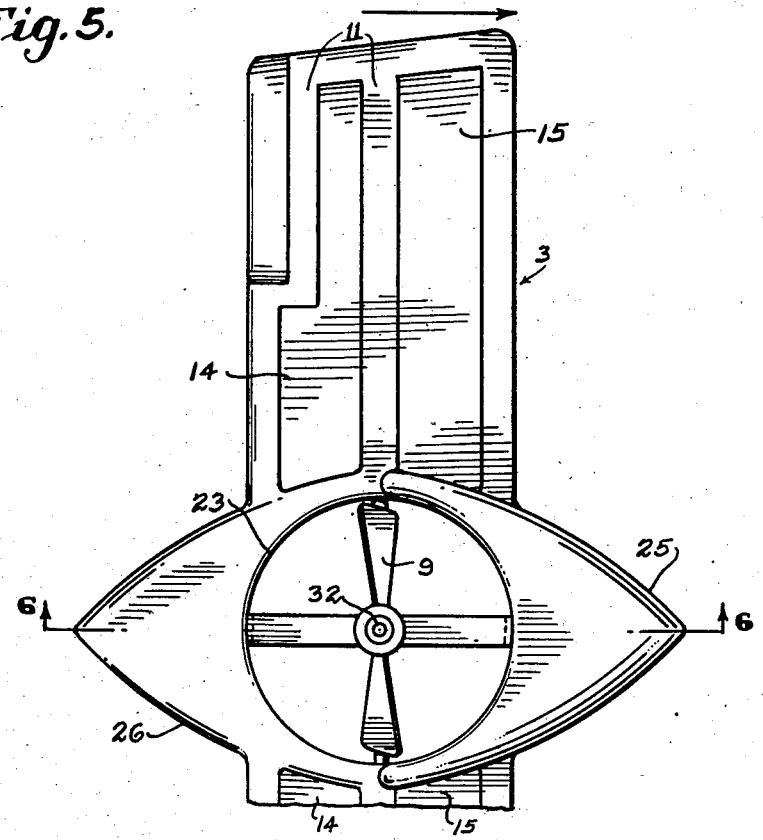
Figure 5 is a plan view of a portion of the wing.

Referring now in detail to the several figures and first adverting to the assembled views shown in Figures 1 and 2, the numeral 1 represents an aircraft which in the present instance is of the heavier-than-air type, having the fuselage 2, wing 3 and the usual landing gear. The main propeller 4 is driven by a power plant of any desired type such as is shown at 5 in Figure 3, while the auxiliary propellers 6 and 7 are selectively driven as will presently appear by a turbine deriving its power either from the exhaust of the main power plant or from a travel created draft, or both together. On top of the wing are the helicopter propellers 8 and 9 suitably mounted to revolve about substantially vertical axes in wells or openings formed in the wing.

The wing is constituted by a framework 11 or its equivalent, provided with openings or louvres 12 and 13, preferably symmetrically disposed on opposite sides of the wing and normally closed by hinged panels 14 and 15. The panels are normally kept closed in any suitable manner as by the spring hinges 16. When the air craft is in horizontal flight, the air pressure on the underside of the panels maintains them normally shut, while when the aircraft is rising vertically, the pilot may minimize the resistance of the wing by opening the panels in a positive manner, reducing the end portions of the wing structure to a mere framework, so that as the aircraft rises vertically through the instrumentality of the helicopter propellers 8 and 9, the displaced air may freely pass through the opposite sides of the wing. The means for positively opening the panels 14 and 15 may be of any suitable construction.

A practical means has been illustrated more or less in detail in Figure 8, comprising levers 17 each including a curved arm pivotally connected to the under surfaces of the panels and a lug 18 to which an operating cable 19 may be attached and leading to an accessible point in the fuselage. The levers 17 are connected to the panels through the intermediary of links 20 and 21, providing lost motion so that in any operative position of the levers 17, compelled by the cables 19, the panels will be capable of opening independently of said operating means through a range limited by the throw of the links 20 and 21.

Independent opening movement of the panels affords an efficient system of stabilizing control for the aircraft when in flight, under conditions frequently met with particularly in stormy weather when powerful downwardly sweeping currents strike the upper wing surface. Ordinarily, if such currents strike with unequal force on the opposite sides of the upper surface of the wing, the craft will be dangerously tipped laterally from its level position. Under the conditions of the present invention, when the aircraft is in horizontal flight, and by that is meant flight in any direction except with the helicopter propellers, the forward motion of the craft creates a pressure on the lower sides of the panels which holds them shut. When however a downwardly directed current of air in excess of the head resistance impinges upon the upper sides of the panels, unequally on the sides of the wing, the predominant pressure will cause the panels on one or the other side to open to a greater or less extent according to the relative value of the downward pressure. This affords a relief for the side of the wing which is overburdened, permitting the aircraft to maintain its lateral equilibrium.

Figure 6:
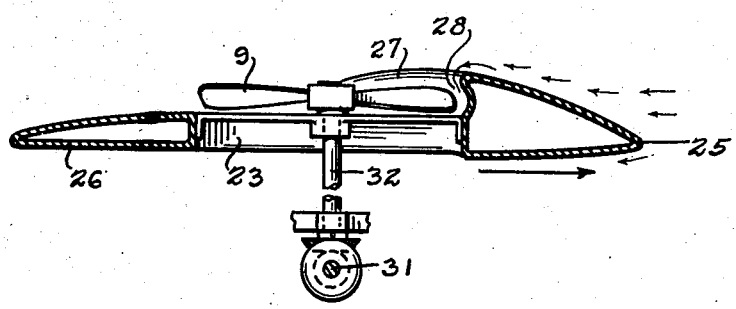
Figure 6 is a cross section taken along the line 6—6 of Figure 5.

The wing is especially modified on each side of the fuselage for the passage of the slip stream generated by the helicopter propellers. With this end in view, the wing is provided with circular openings 22 and 23, and with suitable struts 24 intersecting said openings and affording support for the shafts of the helicopter propellers. The presence of the openings 22 and 23 naturally detracts from the sustaining capacity of the wing, this being compensated by the provision of fore and aft wing extensions 25 and 26. The forward wing extensions have the form of elevated shields of stream line contour partially surrounding the openings 22 and 24, and having walls 27 adjacent said openings and constituting together with the surrounding walls of said openings, wells within or adjacent to which the helicopter propellers revolve. The walls 27 are formed with re-entrant curved surfaces 28 so that the wind which descends from the top edges of said forward extensions into said wells delivers a forward thrust against the walls 27 assisting in the forward propulsion of the aircraft. This is indicated by the arrows in Figures 6 and 9. The vertically projected area of the fore and aft wing extensions are substantially equivalent to the areas of the openings 22 and 23.

Figures 3 and 4 show that the helicopter propellers 8 and 9 are driven from the main power plant by a train of mechanism including a beveled gear 29 on the drive shaft meshing with gears on stub shafts 30 and 31, extending laterally beneath the wing and being connected by suitable gearing with the shafts 32 and 33 of the helicopter propellers. A clutch 34 may be provided between the drive shaft and the driven mechanism.

A turbine 35 is mounted transversely within the fuselage for driving the lateral propellers 6 and 7. Said propellers are connected by means of suitable beveled gear sets 36 and 37, respectively, with a shaft 38 which in turn is connected by a suitable gear set 39 with a shaft 40 suitably geared to the shaft of the turbine. The turbine is preferably of that type which derives its power from the velocity impact of a moving fluid rather than from expansion of fluid in the turbine. The turbine structure per se is described and claimed in my co-pending application, Serial No. 585,597, filed Jan. 8, 1932, and comprising a series of vanes 41 arranged on separate drums 42 axially mounted in operative adjacency and being relatively displaceable circumferentially so as to vary the extent of communication of the vanes of one drum with those of the adjacent drum. This adjustment feature serves the purpose of enabling the turbine to be adjusted to optimum relation to the velocity and volume of the motive fluid.

The turbine is designed to be operated either by exhaust gas from the main power plant, delivered by way of the exhaust pipe 43, the discharge end of which debauches into a flat conical nozzle 44 which distributes the exhaust widthwise through the entire lateral extent of the turbine. Thus during the normal running of the aircraft, the turbine conserves the waste energy of the power plant by transforming the exhaust into power delivered by way of the lateral propellers. The turbine 35 also serves as a safety device when the aircraft is making a steep descent or when it is falling, out of control. Under these conditions, the turbine is operated by the powerful draft of travel created by the descent of the aircraft. The central portion of the wing is provided with an opening 45 normally closed by a hinged panel 46. When it is desired to have the turbine operate by the draft of travel, the panel 46 is opened by suitable operating means exemplified by the cable 47. When in the open position shown in broken lines in Figure 3, the panel 46 acts as a deflector for guiding the air into the mouth of the casing 48 of the turbine. The exhaust from the turbine is carried away in any suitable manner as by the exhaust pipe 49 shown in Fig. 3.

When the aircraft is in steep descent, the draft enters the opening 45 in the direction indicated by the arrows in Figure 3, and it impinges upon the blades of the turbine, rotating it and thereby operating the lateral propellers 6 and 7, bringing the aircraft into control. It is to be understood of course that when the pilot is making intentional dives with the motor running, the turbine may be operated both by the exhaust from the power plant and by the natural draft.

It will be understood that while certain of the features of my invention are particularly adapted for use in aircraft of the heavier-than-air type, others of the features are equally well adapted for the control of aircraft, of inherently buoyant construction.

While I have in the above disclosure described what I believe to be practical features of the invention, it is obvious that the specific details of the structure in which these features are embodied be merely by way of example and not to be construed as limiting the scope of the invention as claimed.

What I claim is:

1. In aircraft, an air foil having leading and trailing edges, and being formed with a propeller well, between said edges, said air foil having extensions forwardly and rearwardly of said propeller well, beyond the continued lines of said leading and trailing edges, the aggregate area of said extensions substantially equaling the cross sectional area of said well.

2. In aircraft, an air foil having leading and trailing edges, and being formed with a propeller well, between said edges, said air foil having extensions forwardly and rearwardly of said propeller well, beyond the continued lines of said leading and trailing edges, the forward extension being elevated above the plane of said air foil so as at least partially to define a circumferential wall for said propeller well, and having a stream line contour.

3. In aircraft, an air foil having leading and trailing edges, and being formed with a propeller well, between said edges, said air foil having extensions forwardly and rearwardly of said propeller well, beyond the continued lines of said leading and trailing edges, the forward extension being elevated above the plane of said air foil so as at least partially to define a circumferential wall for said propeller well, said forward extension being re-entrantly stream lined in the zone of said propeller.

ANTONIO V. SANTARSIERO.